United States Patent
Kim et al.

(10) Patent No.: US 11,489,272 B2
(45) Date of Patent: Nov. 1, 2022

(54) CONNECTOR APPARATUS FOR A BATTERY

(71) Applicants: HYUNDAI MOTOR COMPANY, Seoul (KR); KIA CORPORATION, Seoul (KR); KOREA ELECTRIC TERMINAL CO., LTD., Incheon (KR)

(72) Inventors: Mun Jong Kim, Suwon-si (KR); Sug Il Kang, Incheon (KR)

(73) Assignees: HYUNDAI MOTOR COMPANY, Seoul (KR); KIA CORPORATION, Seoul (KR); KOREA ELECTRIC TERMINAL CO., LTD., Incheon (KR)

( * ) Notice: Subject to any disclaimer, the term of this patent is extended or adjusted under 35 U.S.C. 154(b) by 0 days.

(21) Appl. No.: 17/362,455

(22) Filed: Jun. 29, 2021

(65) Prior Publication Data

US 2022/0102879 A1   Mar. 31, 2022

(30) Foreign Application Priority Data

Sep. 29, 2020   (KR) .................... 10-2020-0127578

(51) Int. Cl.
| | | |
|---|---|---|
| *H01R 11/28* | (2006.01) | |
| *H01M 50/543* | (2021.01) | |
| *H01R 13/629* | (2006.01) | |

(52) U.S. Cl.
CPC ........ *H01R 11/289* (2013.01); *H01M 50/543* (2021.01); *H01R 11/282* (2013.01); *H01R 13/629* (2013.01); *H01M 2220/20* (2013.01); *H01R 2201/26* (2013.01)

(58) Field of Classification Search
CPC ............ H01M 2220/20; H01M 50/543; H01R 2201/26; H01R 13/629; H01R 11/282; H01R 11/289
See application file for complete search history.

(56) References Cited

U.S. PATENT DOCUMENTS

| 7,575,476 | B2 * | 8/2009 | Tyler ...................... H01R 25/00 |
| | | | 439/607.04 |
| 10,128,624 | B2 * | 11/2018 | Tyler .................... H01R 13/113 |
| 10,340,632 | B1 * | 7/2019 | Rangi .................. H01R 13/631 |

FOREIGN PATENT DOCUMENTS

KR   20120059106 A   6/2012

* cited by examiner

*Primary Examiner* — Briggitte R. Hammond
(74) *Attorney, Agent, or Firm* — Lempia Summerfield Katz LLC

(57) ABSTRACT

A connector apparatus for a battery includes: a connector block assembly mounted in a battery case of a battery assembly, and including first and second electrodes facing the interior of the battery case; and a header assembly releasably mounted to the connector block assembly, and including first and second terminals connected to the first and second electrodes, respectively. The header assembly is exposed to the exterior of the battery case and the first and second terminals are electrically connected to terminals of a mating connector, respectively.

13 Claims, 19 Drawing Sheets

CONNECTOR APPARATUS FOR A BATTERY

CROSS-REFERENCE TO RELATED APPLICATION

This application is based on and claims the benefit of priority to Korean Patent Application No. 10-2020-0127578, filed on Sep. 29, 2020, in the Korean Intellectual Property Office, the disclosure of which is incorporated herein in its entirety by reference.

TECHNICAL FIELD

The present disclosure relates to a connector apparatus for a battery, and more particularly, to a connector apparatus for a battery, which is mounted in a battery case of a high-voltage battery assembly for a vehicle.

BACKGROUND

In recent years, as the perception of environmental crisis and depletion of oil resources has increased, research and development of eco-friendly electric vehicles has actively been conducted. Electric vehicles include plug-in hybrid electric vehicles (PHEVs), battery electric vehicles (BEVs), fuel cell electric vehicles (FCEVs), etc.

An electric vehicle is equipped with a battery assembly which is mounted to a vehicle body. In order to mount the battery assembly, it is important to secure an adequate mounting space on the vehicle body. In addition, since the workability of mounting the battery assembly with a large volume and weight on the vehicle body is also an important issue, those having ordinary skill in the art are focusing on research and development of vehicle body design for mounting the battery assembly.

The battery assembly includes one or more battery modules (or battery cells), electric/electronic components associated with the battery modules, a battery case in which the battery modules and the electric/electronic components are received, and a battery cover with which the top of the battery case is covered. The battery assembly may be mounted under a floor of the vehicle body, and a front subframe may be located in front of the battery assembly. The battery case may be mounted to the floor of the vehicle body through front mounting bolts, side mounting bolts, rear mounting bolts, and the like. High-voltage electric/electronic components such as an electrical fuse and an electrical connector may be mounted in the battery case. In particular, the electrical connector may protrude from an exterior surface of the battery case so as to be connected to a mating connector. The electrical connector may be electrically connected to the battery modules in the battery case through electrical wires and internal terminals.

In the battery assembly according to the related art, there is a risk of damage to the protruding electrical connector due to careless transporting and handling or external impacts, requiring the damaged electrical connector to be replaced.

In the battery assembly according to the related art, the internal terminals need to be separated from the battery case in order to replace the damaged electrical connector. In other words, it is impossible to separate only the damaged electrical connector from the battery case to replace it with a new electrical connector. It is also necessary to completely separate the battery case from the floor of the vehicle body and separate the internal terminals located in the battery case beforehand. These issues make the replacement of the damaged electrical connector inconvenient.

The above information described in this background section is provided to assist in understanding the background of the inventive concept. The background section may thus include any technical concept which is not considered as the prior art that is already known to those having ordinary skill in the art.

SUMMARY

The present disclosure has been made to solve the above-mentioned problems occurring in the prior art while advantages achieved by the prior art are maintained intact.

An aspect of the present disclosure provides a connector apparatus for a battery allowing the replacement of a component protruding from a battery case without having to separate the battery case from a floor of a vehicle body.

According to an aspect of the present disclosure, a connector apparatus for a battery may include: a connector block assembly mounted in a battery case of a battery assembly, and including first and second electrodes facing the interior of the battery case; and a header assembly releasably mounted to the connector block assembly, and including first and second terminals connected to the first and second electrodes, respectively. The header assembly may be exposed to the exterior of the battery case, and the first and second terminals may be electrically connected to terminals of a mating connector, respectively.

The connector block assembly may include: a block body mounted on the battery case; and an electrode housing coupled to the block body and having the first and second electrodes mounted therein.

The electrode housing may have first and second slots, into which the first and second electrodes are inserted, respectively.

The first electrode may include a first contact portion contacting the first terminal, and a first support portion perpendicular to the first contact portion. The second electrode may include a second contact portion contacting the second terminal, and a second support portion perpendicular to the second contact portion. The first support portion may extend in an opposite direction of the second support portion.

The connector block assembly may further include a first seal member mounted on edges of the block body to seal a space between the block body and the battery case.

The header assembly may include: a header housing releasably coupled to the block body and having the first and second terminals mounted therein; and a shield shell inserted into the header housing to surround the first and second terminals.

The header housing may include a first coupling portion in which the first terminal is mounted, and a second coupling portion in which the second terminal is mounted.

The header assembly may further include a second seal member mounted on edges of the header housing to seal a space between the header housing and the block body.

The block body may have a central opening in which a portion of the header housing and a portion of the electrode housing are received, and the central opening may be defined by a conductive inner peripheral surface.

The block body may have a conductive projection directly contacting the battery case.

The block body may be made of a conductive material, and a surface of the block body other than the conductive projection and the conductive inner peripheral surface may be coated with a non-conductive material so that the block body may have a non-conductive surface.

The block body may have a first positioning projection and a second positioning projection by which the electrode housing is positioned. The first positioning projection and the second positioning projection may extend toward the interior of the battery case.

The shield shell may include a plurality of contact pieces contacting the conductive inner peripheral surface of the block body.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
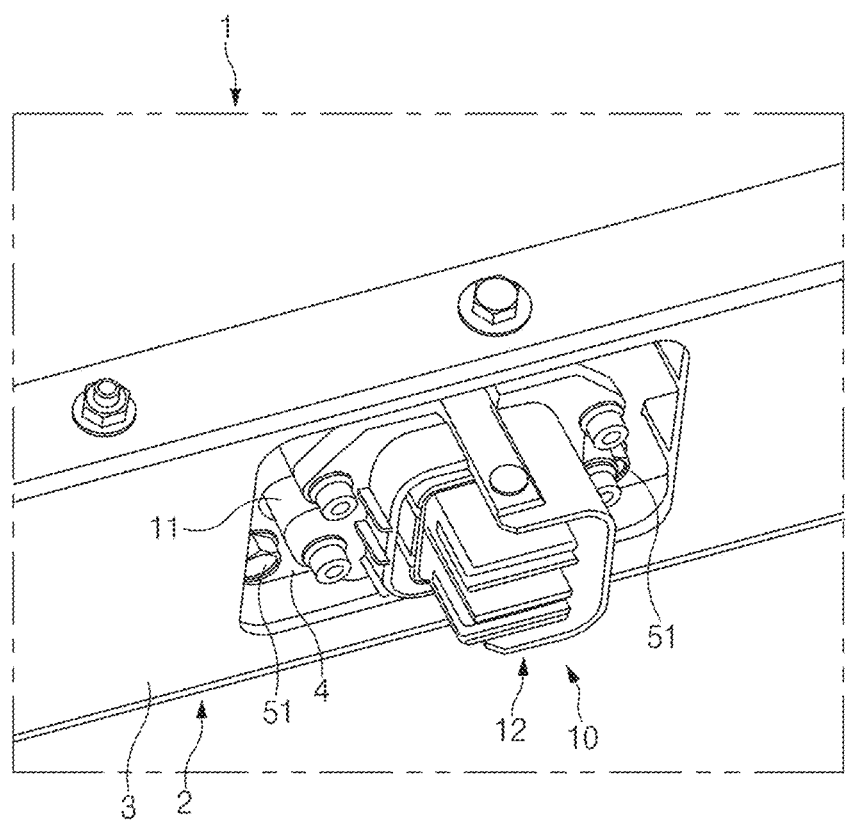
FIG. 1 illustrates a connector apparatus for a battery according to an embodiment of the present disclosure, where the battery is mounted in a battery case of a battery assembly.

Hereinafter, embodiments of the present disclosure are described in detail with reference to the accompanying drawings. In the drawings, the same reference numerals are used throughout to designate the same or equivalent elements. In addition, a detailed description of well-known techniques associated with the present disclosure have been omitted in order not to unnecessarily obscure the gist of the present disclosure.

Terms such as first, second, A, B, (a), and (b) may be used to describe the elements in embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those having ordinary skill in the field of art to which the present disclosure belongs. Such terms as those defined in a generally used dictionary are to be interpreted as having meanings equal to the contextual meanings in the relevant field of art. Such terms are not to be interpreted as having ideal or excessively formal meanings unless clearly defined as having such in the present application.

Figure 2:
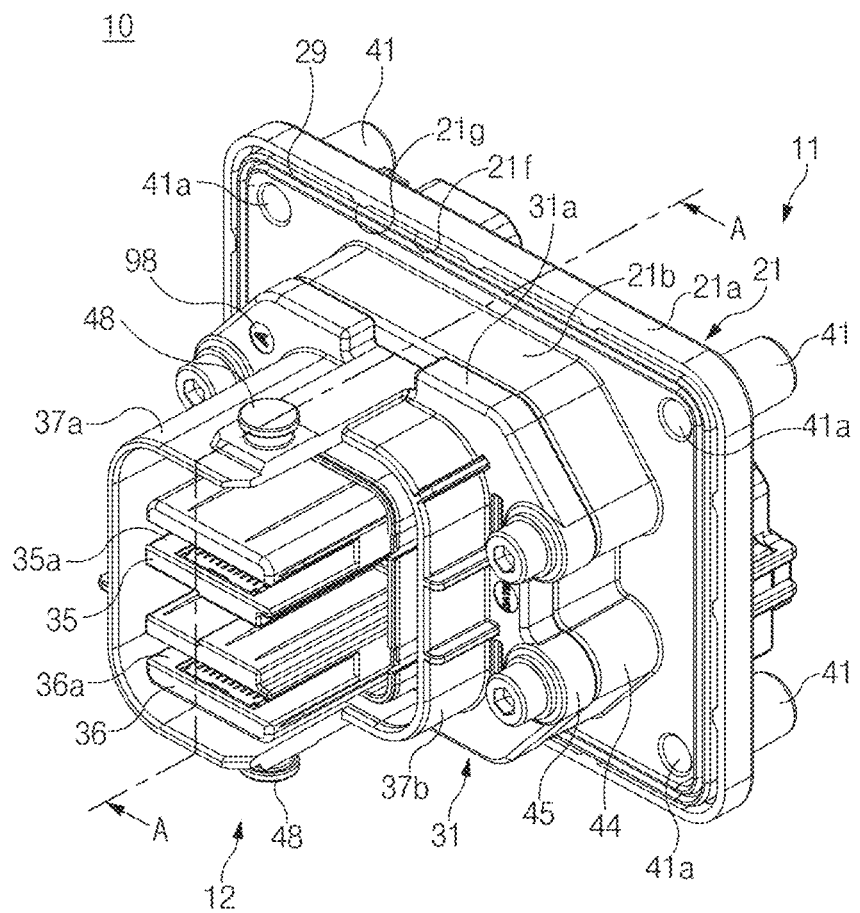
FIG. 2 illustrates a perspective view of a connector apparatus for a battery according to an embodiment of the present disclosure.

Referring to FIGS. 1 and 2, a connector apparatus 10 for a battery according to an embodiment of the present disclosure may include a connector block assembly 11 mounted in a battery case 2 of a battery assembly 1, and a header assembly 12 releasably mounted to the connector block assembly 11.

The connector block assembly 11 may include a block body 21 mounted on the battery case 2, an electrode housing 22 coupled to the block body 21, and a pair of electrodes 23 and 24 mounted in the electrode housing 22.

Referring to FIG. 1, the battery assembly 1 may include one or more battery modules (or battery cells), and the battery case 2 in which the battery modules are received. The battery case 2 may have a frame 3 and a recessed wall 4 recessed from the frame 3 toward an interior space of the battery case 2. As the connector block assembly 11 is mounted on the recessed wall 4 of the battery case 2, the connector apparatus 10 may be less exposed from the battery case 2.

Figure 3:
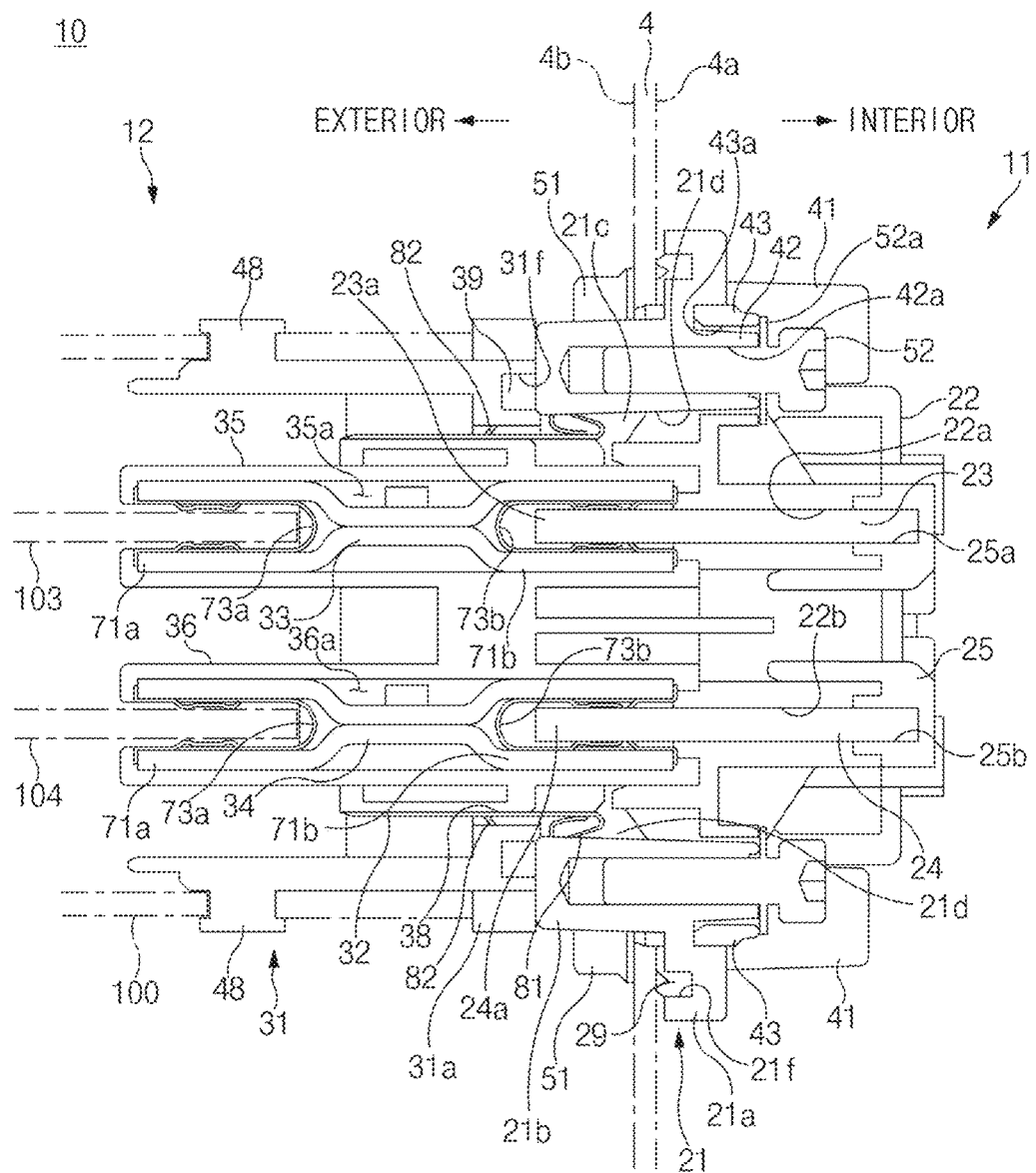
FIG. 3 illustrates a cross-sectional view, taken along line A-A of FIG. 2.
Figure 4:
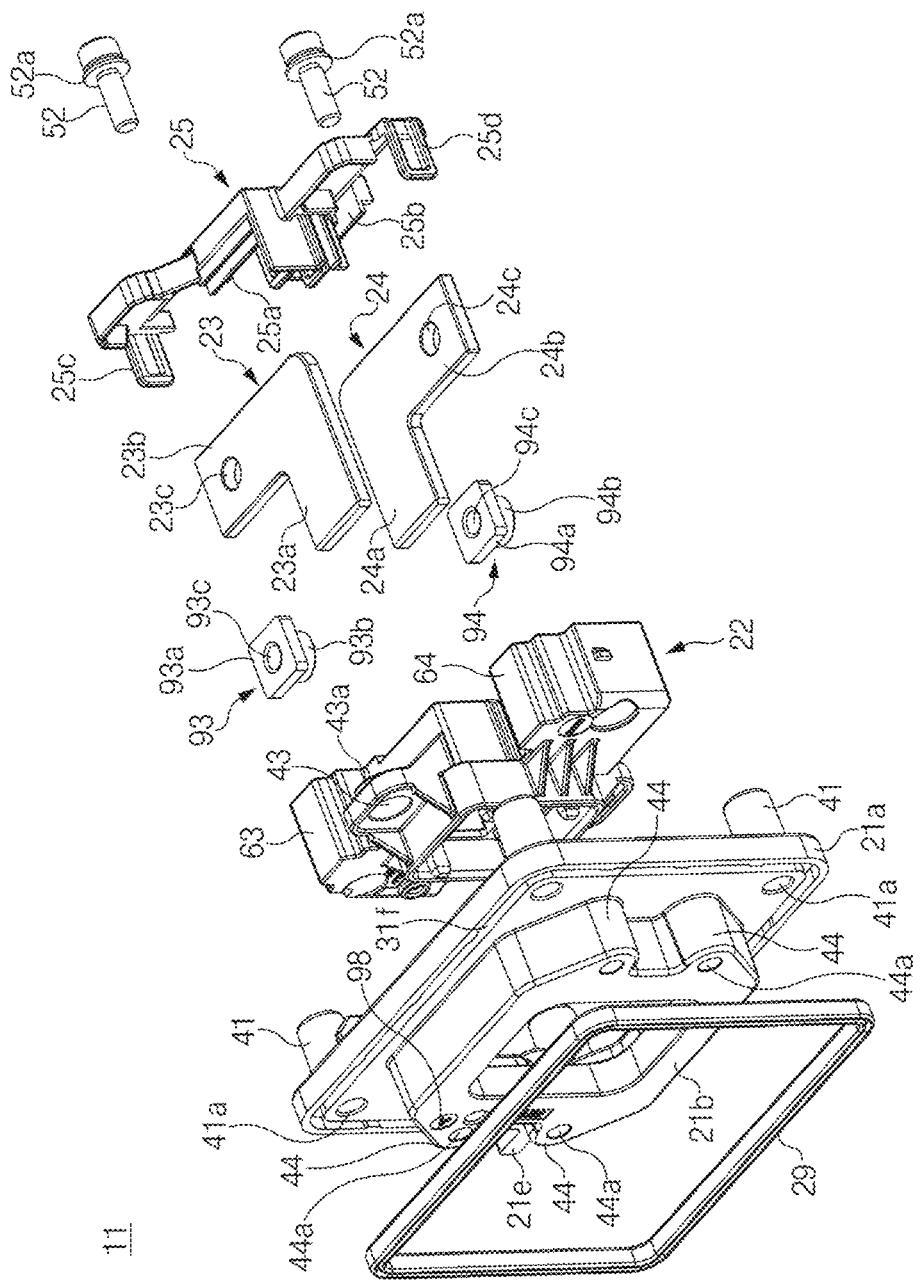
FIG. 4 illustrates an exploded perspective view of a connector block assembly in a connector apparatus for a battery according to an embodiment of the present disclosure.

Referring to FIGS. 2-4, the block body 21 may include a base 21a and a raised portion 21b protruding from the base 21a toward the outside of the battery case 2.

The base 21a may be mounted on the recessed wall 4 of the battery case 2 through a plurality of first mounting bolts 51, and the base 21a may have a plurality of first mounting bosses 41 integrally formed on edges (corner portions) thereof. Each first mounting boss 41 may extend from the base 21a toward the interior space of the battery case 2. The first mounting boss 41 may have a first mounting hole 41a defined therein, and the first mounting hole 41a may have an internal thread into which the first mounting bolt 51 is screwed. A first end portion of the first mounting hole 41a may be open to the exterior space of the battery case 2, and a second end portion of the first mounting hole 41a may be closed to the interior space of the battery case 2. As illustrated in FIG. 3, the plurality of first mounting bolts 51 may be screwed into the plurality of first mounting holes 41a, respectively, so that the base 21a of the block body 21 may be mounted on the recessed wall 4. Referring to FIG.

3, the recessed wall 4 may have an interior surface 4a facing the interior space of the battery case 2 and an exterior surface 4b facing the exterior space of the battery case 2, and the base 21 of the block body 21 may contact the interior surface 4a of the recessed wall 4.

Referring to FIGS. 3 and 4, the block body 21 may have a central opening 21c defined in the center thereof, and a conductive inner peripheral surface 21d defining the central opening 21c.

Figure 6:
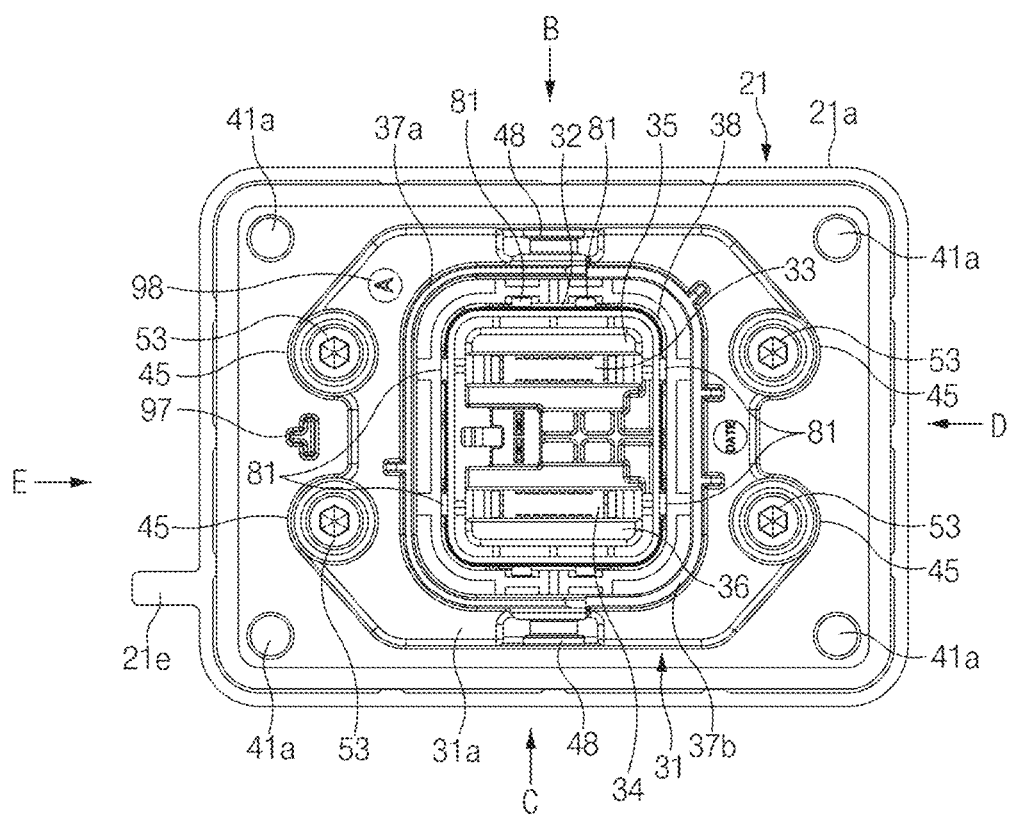
FIG. 6 illustrates a front view of the connector apparatus for a battery illustrated in FIG. 2.
Figure 7:
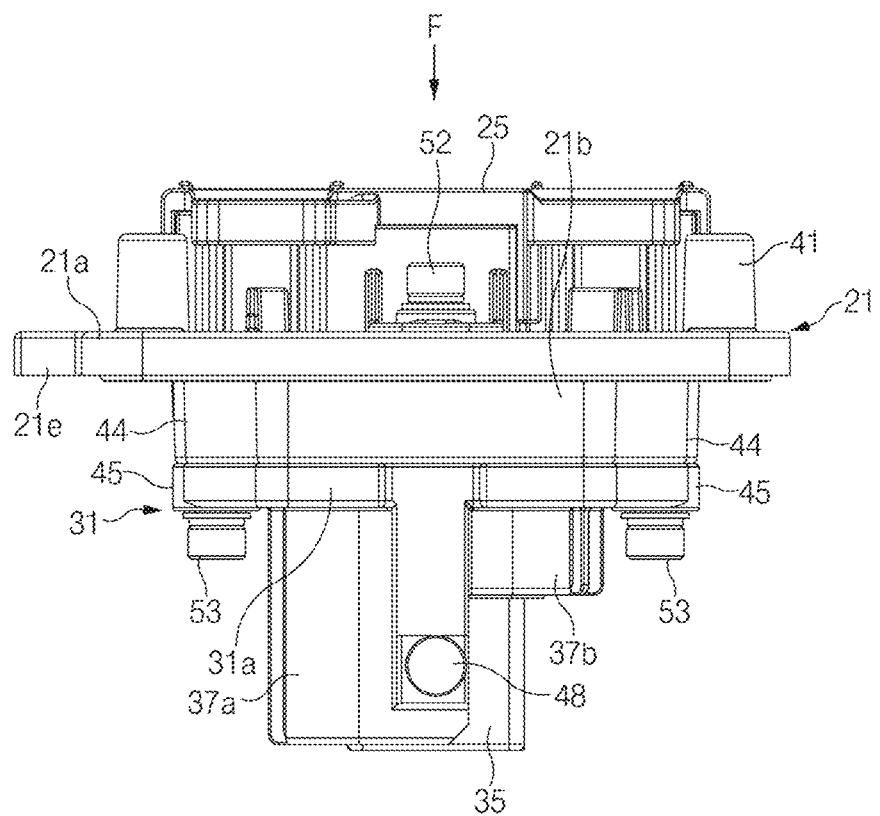
FIG. 7 illustrates a plan view, which is viewed in a direction indicated by arrow B of FIG. 6.
Figure 8:
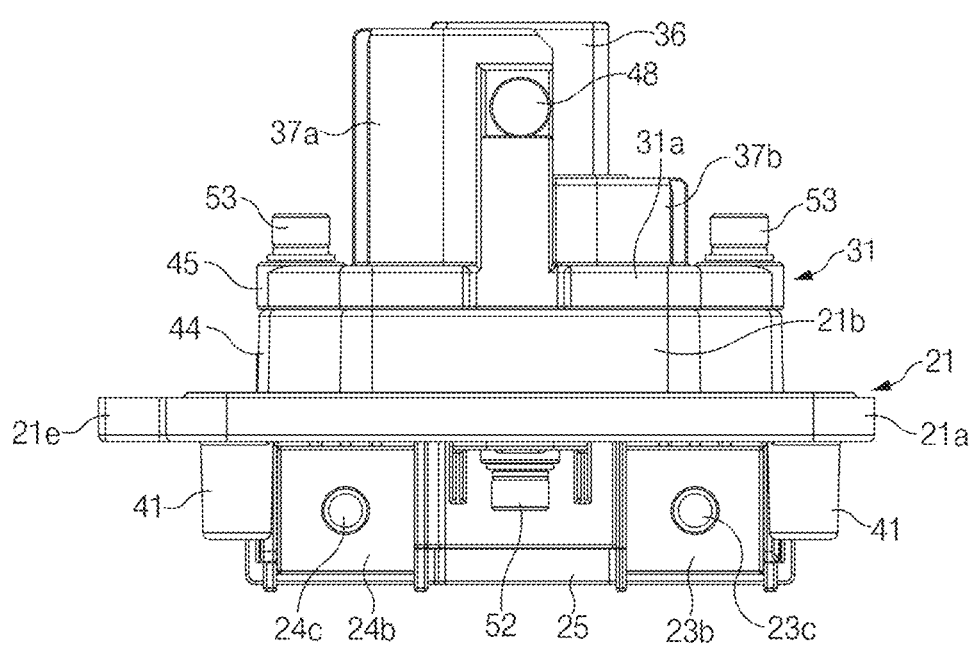
FIG. 8 illustrates a bottom view, which is viewed in a direction indicated by arrow C of FIG. 6.
Figure 9:
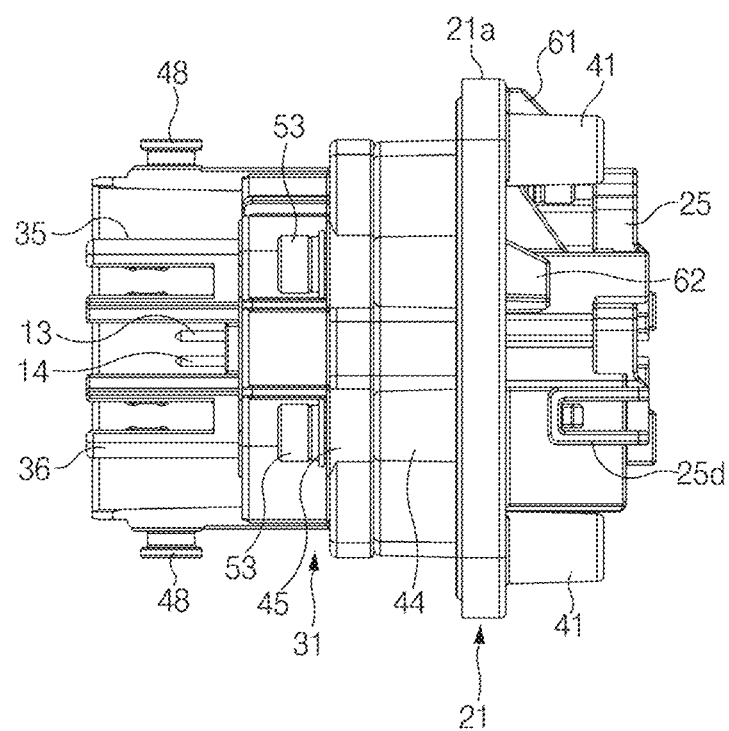
FIG. 9 illustrates a right side view, which is viewed in a direction indicated by arrow D of FIG. 6.
Figure 10:
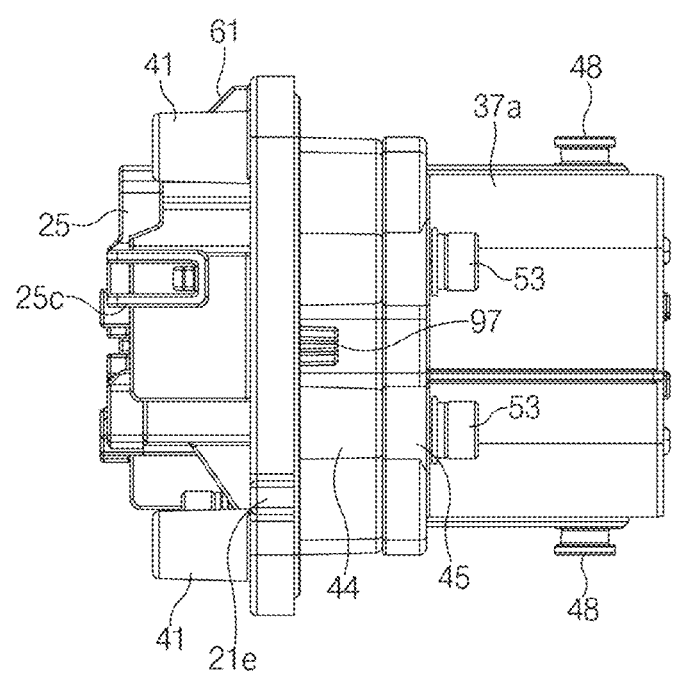
FIG. 10 illustrates a left side view, which is viewed in a direction indicated by arrow E of FIG. 6.

Referring to FIG. 6, the block body 21 may have a conductive projection 21e electrically connected to the battery case 2. The conductive projection 21e may extend from the base 21a in a width direction of the connector apparatus 10, and the conductive projection 21e may directly contact or be coupled to the battery case 2.

The block body 21 may be made of a conductive material such as aluminum, and a surface of the block body 21 except for the conductive projection 21e and the conductive inner peripheral surface 21d may be evenly coated with a non-conductive layer so that the block body 21 may have a non-conductive surface. Accordingly, insulated connections between the non-conductive surface of the block body 21, the electrode housing 22, and a header housing 31 may be made. Since the conductive inner peripheral surface 21d and the conductive projection 21e are not coated with the non-conductive layer, the conductive inner peripheral surface 21d and the conductive projection 21e may have electrical conductivity.

The pair of electrodes 23 and 24 may be electrically connected to the battery modules (or battery cells) of the battery assembly 1 through electrical wires and/or the like. The pair of electrodes 23 and 24 may be divided into a first electrode 23 and a second electrode 24 having opposite polarities. For example, when the first electrode 23 is negative (−), the second electrode 24 is positive (+), and when the first electrode 23 is positive (+), the second electrode 24 is negative (−).

The electrode housing 22 may be made of an insulating material, and the electrode housing 22 may receive the pair of electrodes 23 and 24 therein. Referring to FIG. 3, the electrode housing 22 may have an exterior surface facing the exterior space of the battery case 2 and an interior surface facing the interior space of the battery case 2. A portion of the electrode housing 22 may be inserted into the central opening 21c of the block body 21. The electrode housing 22 may have a first slot 22a in which the first electrode 23 is received, and a second slot 22b in which the second electrode 24 is received. The first slot 22a and the second slot 22b may extend through the exterior surface and interior surface of the electrode housing 22. The first slot 22a and the second slot 22b may be spaced apart from each other in a height direction of the electrode housing 22, and accordingly the first electrode 23 and the second electrode 24 may be spaced apart from each other in the height direction of the electrode housing 22.

Referring to FIG. 4, the first electrode 23 may include a first contact portion 23a and a first support portion 23b perpendicular to the first contact portion 23a. In other words, the first electrode 23 may have an L shape. The first contact portion 23a may extend in a longitudinal direction of the connector apparatus 10, and the first support portion 23b may extend in the width direction of the connector apparatus 10. Thus, an axis of the first contact portion 23a may be perpendicular to an axis of the first support portion 23b.

Figure 12:
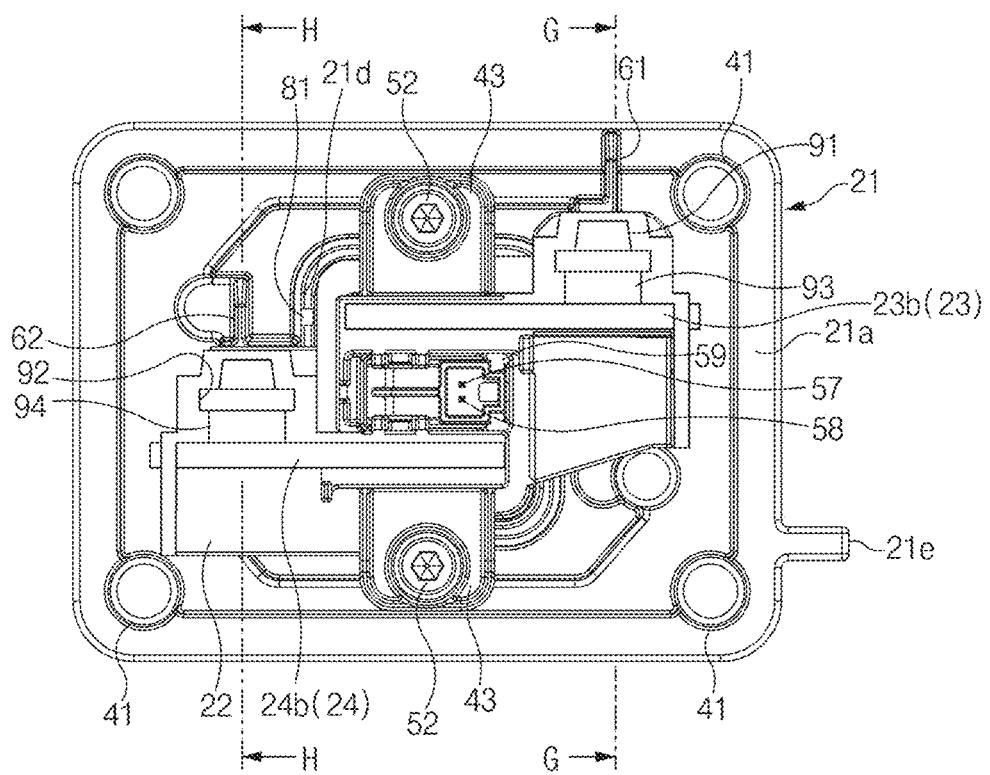
FIG. 12 illustrates the connector apparatus for a battery illustrated in FIG. 11, from which an electrode cover is omitted.
Figure 13:
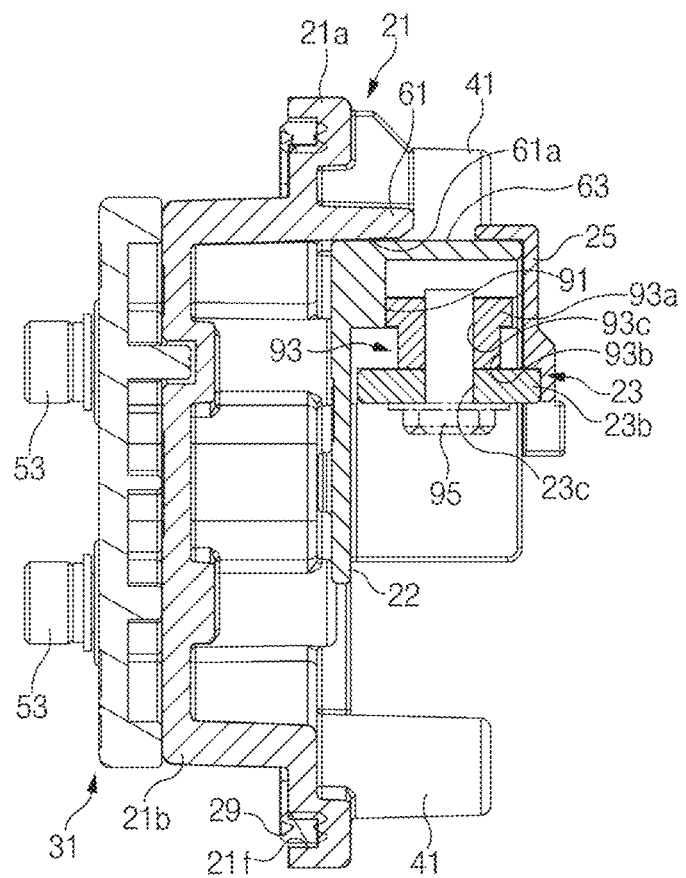
FIG. 13 illustrates a cross-sectional view, taken along line G-G of FIG. 12.

Referring to FIGS. 3 and 12, the first contact portion 23a may have an outer end portion facing the exterior of the battery case 2 and an inner end portion facing the interior of the battery case 2. The outer end portion of the first contact portion 23a may be chamfered so that the first contact portion 23a may be easily inserted into the first slot 22a. The outer end portion of the first contact portion 23a may protrude from the first slot 22a toward the exterior of the battery case 2, and the first support portion 23b may extend from the inner end portion of the first contact portion 23a. As the first support portion 23b is supported to the interior surface of the electrode housing 22, the first support portion 23b may serve as a stopper regulating a protruding length of the first contact portion 23a. The first support portion 23b may have a first through hole 23c. The battery module (or battery cell) may be located inside the battery case 2, and the first support portion 23b may be electrically connected to a first terminal of the battery module (or battery cell) through a first electrical wire. Referring to FIG. 13, a first conductive nut 93 may be aligned with the first through hole 23c of the first support portion 23b. A first conductive bolt 95 may pass through the first through hole 23c of the first support portion 23b and be screwed into the first conductive nut 93 so that a terminal of the first electrical wire may be electrically connected to the first electrode 23. In other words, the first electrode 23 may be electrically connected to the first terminal of the battery module located in the battery case 2 through the first conductive nut 93 and the first conductive bolt 95.

Referring to FIGS. 12 and 13, the electrode housing 22 may have a first recess 91 in which the first conductive nut 93 is received. The first conductive nut 93 may have a first screw hole 93c aligned with the first through hole 23c of the first electrode 23. The first conductive nut 93 may have a square head 93a and a cylindrical portion 93b extending from the square head 93a, and the first recess 91 may have a square shape corresponding to the square head 93a. As the square head 93a of the first conductive nut 93 is fitted into the first recess 91, and the first conductive bolt 95 is screwed into the first conductive nut 93, the first conductive nut 93 may be prevented from slipping in a rotation direction of the first conductive bolt 95.

Referring to FIG. 4, the second electrode 24 may include a second contact portion 24a and a second support portion 24b perpendicular to the second contact portion 24a. That is, the second electrode 24 may have an L shape. The second contact portion 24a may extend in the longitudinal direction of the connector apparatus 10, and the second support portion 24b may extend in the width direction of the connector apparatus 10. Thus, an axis of the second contact portion 24a may be perpendicular to an axis of the second support portion 24b.

Figure 14:
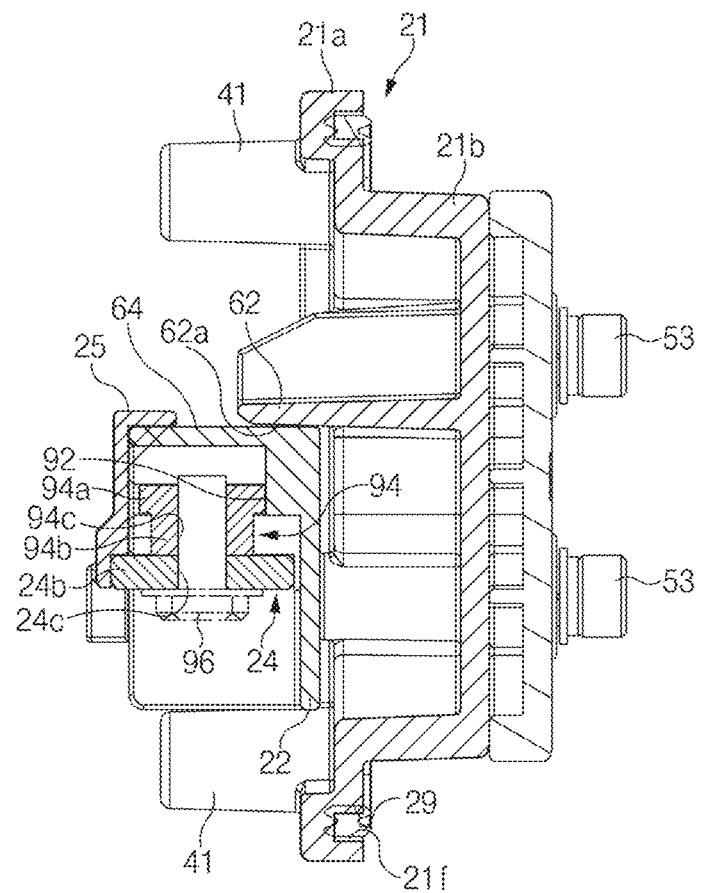
FIG. 14 illustrates a cross-sectional view, taken along line H-H of FIG. 12.

Referring to FIGS. 3 and 12, the second contact portion 24a may have an outer end portion facing the exterior of the battery case 2 and an inner end portion facing the interior of the battery case 2. The outer end portion of the second contact portion 24a may be chamfered so that the second contact portion 24a may be easily inserted into the second slot 22b. The outer end portion of the second contact portion 24a may protrude from the second slot 22b toward the exterior of the battery case 2, and the second support portion 24b may extend from the inner end portion of the second contact portion 24a. As the second support portion 24b is supported to the interior surface of the electrode housing 22, the second support portion 24b may serve as a stopper regulating a protruding length of the second contact portion 24a. The second support portion 24b may have a second through hole 24c. The second support portion 24b may be electrically connected to a second terminal of the battery module (or battery cell) located in the battery case 2 through a second electrical wire. Referring to FIG. 14, a second conductive nut 94 may be aligned with the second through hole 24c of the second support portion 24b, and a second conductive bolt 96 may pass through the second through hole 24c of the second support portion 24b and be screwed into the second conductive nut 94 so that a terminal of the second electrical wire may be electrically connected to the second electrode 24. In other words, the second electrode 24 may be electrically connected to the second terminal of the battery module located in the battery case 2 through the second conductive nut 94 and the second conductive bolt 96.

Referring to FIGS. 12 and 14, the electrode housing 22 may have a second recess 92 in which the second conductive nut 94 is received. The second conductive nut 94 may have a second screw hole 94c aligned with the second through hole 24c of the second electrode 24. The second conductive nut 94 may have a square head 94a and a cylindrical portion 94b extending from the square head 94a, and the second recess 92 may have a square shape corresponding to the square head 94a. As the square head 94a of the second conductive nut 94 is fitted into the second recess 92, and the second conductive bolt 96 is screwed into the second conductive nut 94, the second conductive nut 94 may be prevented from slipping in a rotation direction of the second conductive bolt 96.

Referring to FIGS. 4 and 12, the first support portion 23b may extend in an opposite direction of the second support portion 24b. Thus, interference may be prevented during the assembly of the first electrode 23 and the second electrode 24 and the connections of the electrical wires.

Referring to FIG. 3, as an electrode cover 25 is coupled to the electrode housing 22, the first electrode 23 and the second electrode 24 may be fixed to the electrode housing 22. The electrode cover 25 may be made of an insulating material. Referring to FIG. 4, the electrode cover 25 may have a plurality of snap clips 25c and 25d, and the electrode housing 22 may have a plurality of snap projections fitted to the snap clips 25c and 25d. As the electrode cover 25 is snap-fitted to the electrode housing 22 through the snap clips 25c and 25d, the electrode cover 25 may support the first support portion 23b of the first electrode 23 and the second support portion 24b of the second electrode 24. Referring to FIGS. 3 and 4, the electrode cover 25 may have a first groove 25a into which the first support portion 23b of the first electrode 23 is fitted, and a second groove 25b into which the second support portion 24b of the second electrode 24 is fitted.

Referring to FIG. 3, the block body 21 may have a second mounting boss 42, and the second mounting boss 42 may have a second mounting hole 42a defined therein. The second mounting hole 42a may have an internal thread into which a second mounting bolt 52 is screwed. A first end portion of the second mounting hole 42a may be closed to the exterior space of the battery case 2, and a second end portion of the second mounting hole 42a may be open to the interior space of the battery case 2. The electrode housing 22 may have a third mounting boss 43, and the third mounting boss 43 may have a through hole 43a. As the second mounting boss 42 of the block body 21 is inserted into the through hole 43a of the third mounting boss 43 of the electrode housing 22, and the second mounting bolt 52 is screwed into the second mounting hole 42a, the electrode housing 22 may be mounted to the block body 21. The second mounting bolt 52 may be a bolt-with-washer in which a washer 52a is closely attached to a head portion of the bolt. The washer 52a of the second mounting bolt 52 may support the second mounting boss 42 and the third mounting boss 43.

Referring to FIGS. 2 and 3, the block body 21 may have a seal groove 21f extending along the edges of the base 21a, and a first seal member 29 may be mounted in the seal groove 21f. The first seal member 29 may seal a space between the block body 21 and the recessed wall 4 of the battery case 2. Referring to FIG. 2, a plurality of protrusions 21g may be formed in the seal groove 21f, and the plurality of protrusions 21g may be spaced apart from each other along the seal groove 21f. As each of the protrusions 21g presses the first seal member 29, the first seal member 29 may be stably held in the seal groove 21f.

Referring to FIGS. 11-14, the block body 21 may have a first positioning projection 61 and a second positioning projection 62 by which the electrode housing 22 is positioned. The first positioning projection 61 and the second positioning projection 62 may be spaced apart from each other in the width direction and height direction of the connector apparatus 10. The first positioning projection 61 and the second positioning projection 62 may extend from the block body 21 toward the interior of the battery case 2. The first positioning projection 61 may have a flat first support surface 61a, and the second positioning projection 62 may have a flat second support surface 62a. The electrode housing 22 may have a first contact surface 63 contacting the first support surface 61a of the first positioning projection 61, and a second contact surface 64 contacting the second support surface 62a of the second positioning projection 62. The first contact surface 63 may contact and be seated on the first support surface 61a of the first positioning projection 61, and the second contact surface 64 may contact and be seated on the second support surface 62a of the second positioning projection 62. When the electrode housing 22 is coupled to the block body 21, the first contact surface 63 of the electrode housing 22 may be supported by the first positioning projection 61 of the block body 21 and the second contact surface 64 of the electrode housing 22 may be supported by the second positioning projection 62 of the block body 21 so that the first electrode 23 and the second electrode 24 may be spaced apart from the conductive inner peripheral surface 21d of the block body 21. Thus, the first electrode 23 and the second electrode 24 may be prevented from contacting the conductive inner peripheral surface 21d of the block body 21.

The block body 21 may have a plurality of fourth mounting bosses 44 integrally formed on edges of the raised portion 21b. Each fourth mounting boss 44 may have a fourth mounting hole 44a, and the fourth mounting hole 44a may have an internal thread into which a third mounting bolt 53 is screwed.

Referring to FIG. 6, the block body 21 may have a plurality of identifiers 97 and 98 providing an assembly direction, the specifications of the battery assembly 1, and the like. The plurality of identifiers 97 and 98 may include an identification projection 97 giving directions for assembling the block body 21 and the header housing 31, and an identification mark 98 indicating the specifications of the battery assembly 1. The identification projection 97 may be a T-shaped projection, and the identification projection 97 may indicate the assembly direction of the block body 21 and the header housing 31.

Figure 5:
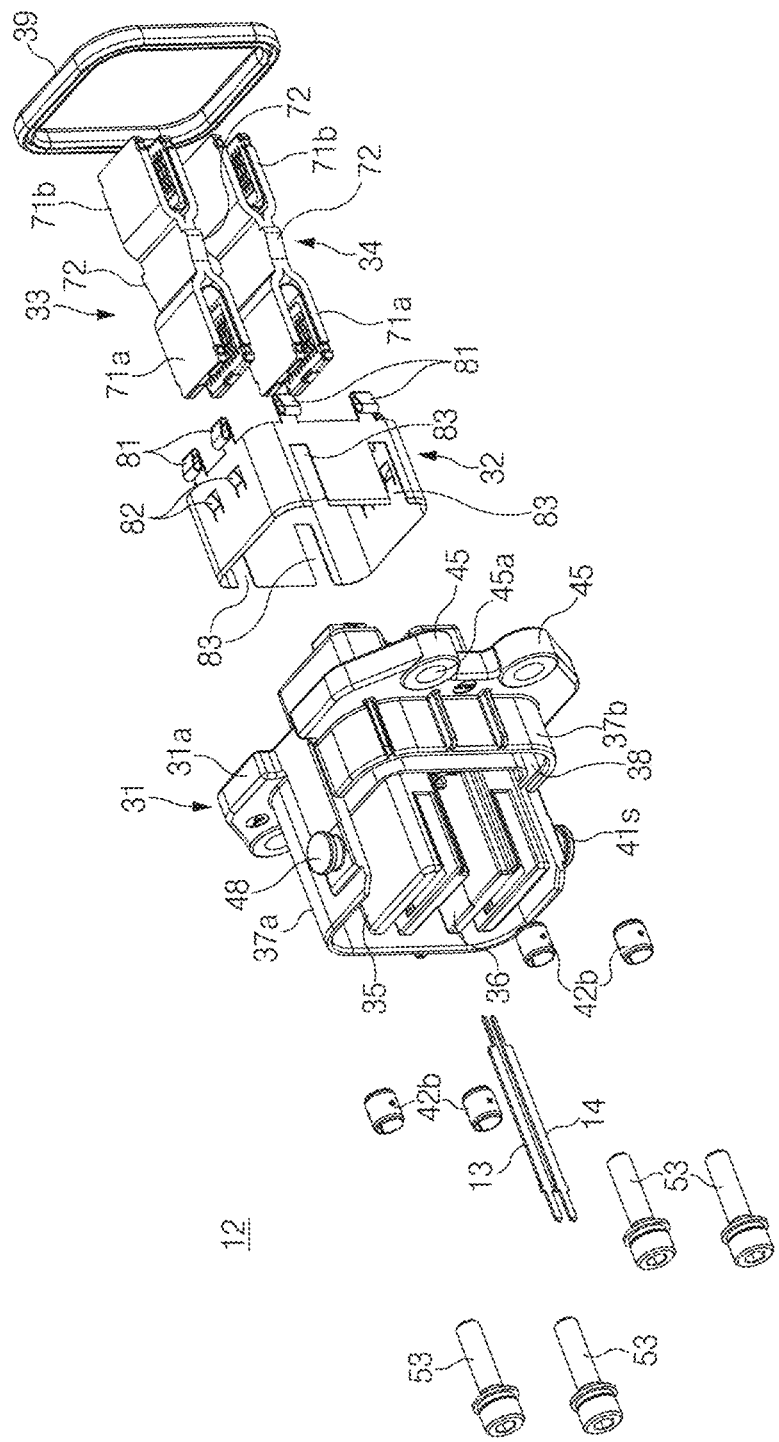
FIG. 5 illustrates an exploded perspective view of a header assembly in a connector apparatus for a battery according to an embodiment of the present disclosure.

Referring to FIGS. 3 and 5, the header assembly 12 may include the header housing 31 releasably coupled to the block body 21, and a pair of terminals 33 and 34 mounted in the header housing 31. The header assembly 12 may be partially exposed to the exterior space of the battery case 2, and a mating connector, 100 with connector terminals 103, 104, located outside the battery case 2 may be releasably connected to the header assembly 12.

Referring to FIGS. 3 and 5, the header housing 31 may include a base 31a, and a first coupling portion 35 and a second coupling portion 36 located at the center of the base 31a. The first coupling portion 35 and the second coupling portion 36 may extend in the longitudinal direction of the connector apparatus 10, and the first coupling portion 35 and the second coupling portion 36 may be parallel to each other. The first coupling portion 35 may have a first cavity 35a in which a first terminal 33 is received, and the second coupling portion 36 may have a second cavity 36a in which a second terminal 34 is received. A portion of the header housing 31 may be received in the central opening 21c of the block body 21.

Figure 18:
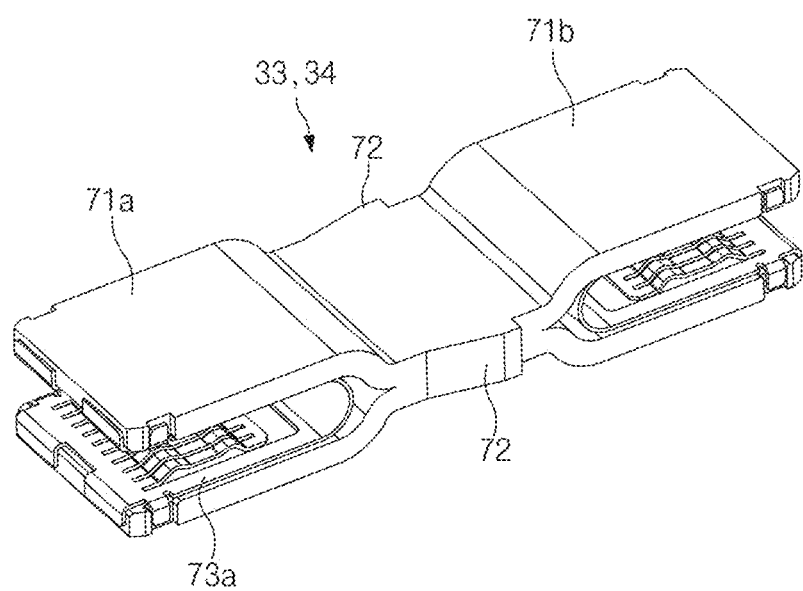
FIG. 18 illustrates a perspective view of first and second terminals in a connector apparatus for a battery according to an embodiment of the present disclosure.

Referring to FIGS. 3 and 18, each of the first terminal 33 and the second terminal 34 may include an outer contact 71a facing the exterior of the battery case 2 and an inner contact 71b facing the interior of the battery case 2. The outer contact 71a may have a U shape, and an outer contact insert 73a may be attached to the inside of the outer contact 71a. The outer contact insert 73a may be an elastic U-shaped spring. The inner contact 71b may have a U shape, and an inner contact insert 73b may be attached to the inside of the inner contact 71b. The inner contact insert 73b may be an elastic U-shaped spring.

Referring to FIG. 3, as a first terminal 103 of the mating connector 100 is inserted into the outer contact insert 73a of the first terminal 33, the outer contact 71a of the first terminal 33 may be electrically connected to the first terminal 103 of the mating connector 100. As the first contact portion 23a of the first electrode 23 is inserted into the inner contact insert 73b of the first terminal 33, the inner contact 71b of the first terminal 33 may be electrically connected to the first electrode 23.

Referring to FIG. 3, as a second terminal 104 of the mating connector 100 is inserted into the outer contact insert 73a of the second terminal 34, the outer contact 71a of the second terminal 34 may be electrically connected to the second terminal 104 of the mating connector 100. As the second contact portion 24a of the second electrode 24 is inserted into the inner contact insert 73b of the second terminal 34, the inner contact 71b of the second terminal 34 may be electrically connected to the second electrode 24.

Figure 19:
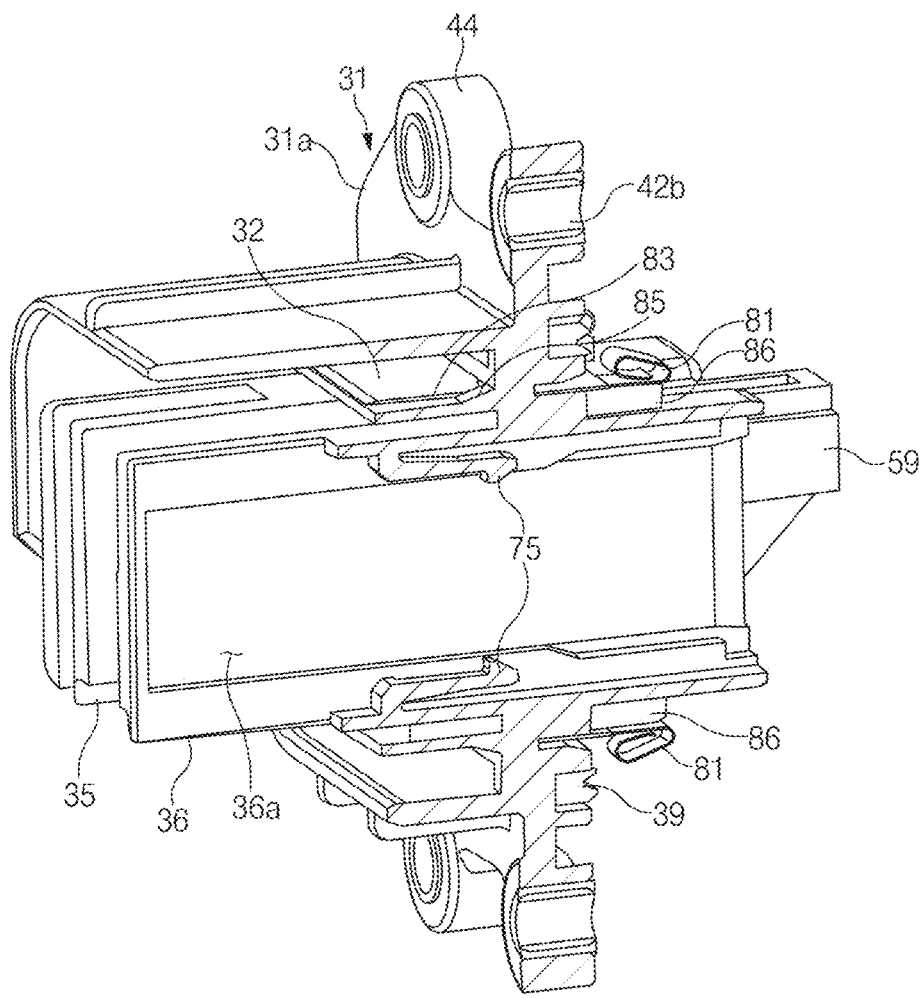
FIG. 19 illustrates a partial cut-away perspective view of a second cavity of a second coupling portion of a header housing in a connector apparatus for a battery according to an embodiment of the present disclosure.

Referring to FIGS. 5 and 18, each of the first terminal 33 and the second terminal 34 may have a pair of locking projections 72, and each locking projection 72 may be inclined. Referring to FIG. 19, the second coupling portion 36 may have locking lances 75 provided in the second cavity 36a. Although not illustrated in FIG. 19, the first coupling portion 35 may have locking lances provided in the first cavity 35a, like the locking lances of the second coupling portion 36. When the first terminal 33 and the second terminal 34 are inserted into the first cavity 35a of the first coupling portion 35 and the second cavity 36a of the second coupling portion 36, the locking projections 72 may engage with the locking lances 75, respectively. Thus, the first terminal 33 and the second terminal 34 may be mounted in the first cavity 35a of the first coupling portion 35 and the second cavity 36a of the second coupling portion 36, respectively.

The header housing 31 may have a plurality of fifth mounting bosses 45 integrally formed on edges of the base 31a, and each fifth mounting boss 45 may have a fifth mounting hole 45a. A bushing 46 may be fitted into the fifth mounting hole 45a. As the fifth mounting boss 45 of the header housing 31 is aligned with the fourth mounting boss 44 of the block body 21, the fifth mounting hole 45a may be aligned with the fourth mounting hole 44a. As the third mounting bolt 53 is screwed into the fourth mounting hole 44a, the header housing 31 may be mounted to the block body 21.

The header housing 31 may have an annular slot 38 surrounding the first coupling portion 35 and the second coupling portion 36. As a shield shell 32 is inserted into the slot 38, the shield shell 32 may surround the first terminal 33 and the second terminal 34.

Figure 15:
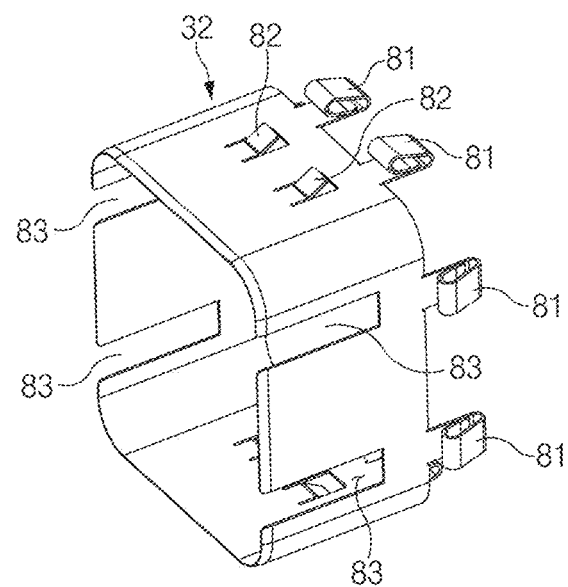
FIG. 15 illustrates a perspective view of a shield shell in a connector apparatus for a battery according to an embodiment of the present disclosure.
Figure 17:
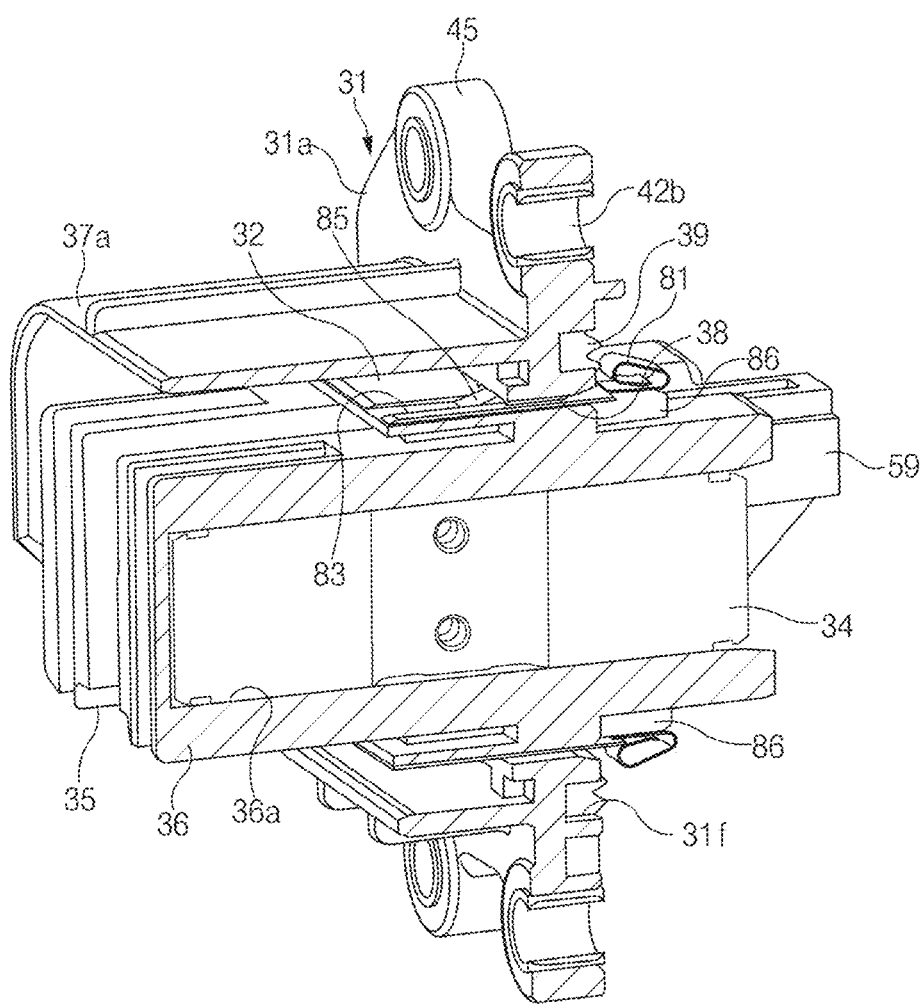
FIG. 17 illustrates a partial cut-away perspective view of a state in which a fitting projection of a header housing is fitted into a fitting groove of a shield shell in a connector apparatus for a battery according to an embodiment of the present disclosure.

The shield shell 32 may be made of a conductive material. Referring to FIGS. 5 and 15, the shield shell 32 may have a plurality of contact pieces 81, a plurality of locking lances 82, and a plurality of fitting grooves 83. The plurality of contact pieces 81 may contact the conductive inner peripheral surface 21d of the block body 21. The plurality of locking lances 82 may be formed by lancing, and as illustrated in FIG. 3, the plurality of locking lances 82 may be fitted into the slot 38 of the header housing 31. The plurality of fitting grooves 83 may extend in the longitudinal direction of the connector apparatus 10. Referring to FIG. 17, the header housing 31 may have a plurality of fitting projections 85, and the fitting projections 85 of the header housing 31 may be fitted into the fitting grooves 83 of the shield shell 32.

As the contact pieces 81 of the shield shell 32 contact the conductive inner peripheral surface 21d of the block body 21, and the conductive projection 21e of the block body 21 contacts the battery case 2, the shield shell 32 may be grounded to the battery case 2. The shield shell 32 may provide electromagnetic shielding for the first terminal 33 and the second terminal 34, thereby reducing noise of the first terminal 33 and the second terminal 34.

Figure 16:
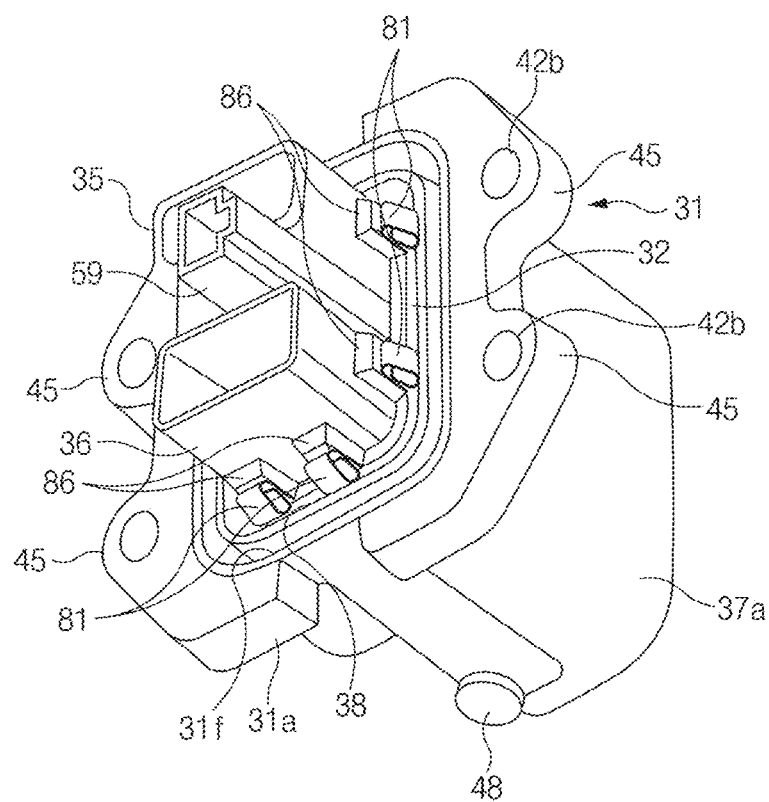
FIG. 16 illustrates support projections of a header housing and contact pieces of a shield shell in a connector apparatus for a battery according to an embodiment of the present disclosure.

Referring to FIG. 16, the header housing 31 may have a plurality of support projections 86 supporting the plurality of contact pieces 81, respectively. The plurality of support projections 86 may protrude from the first coupling portion 35 and the second coupling portion 36.

Referring to FIGS. 3 and 16, the header housing 31 may have a second seal groove 31f extending along the edges of the base 31a. A second seal member 39 may be mounted in the second seal groove 31f. The second seal member 39 may seal a space between the base 31a of the header housing 31 and the base 21a of the block body 21.

Referring to FIG. 2, the header housing 31 may include a first protector 37a and a second protector 37b surrounding the first coupling portion 35 and the second coupling portion 36. A length of the first protector 37a may be greater than a length of the second protector 37b.

Figure 11:
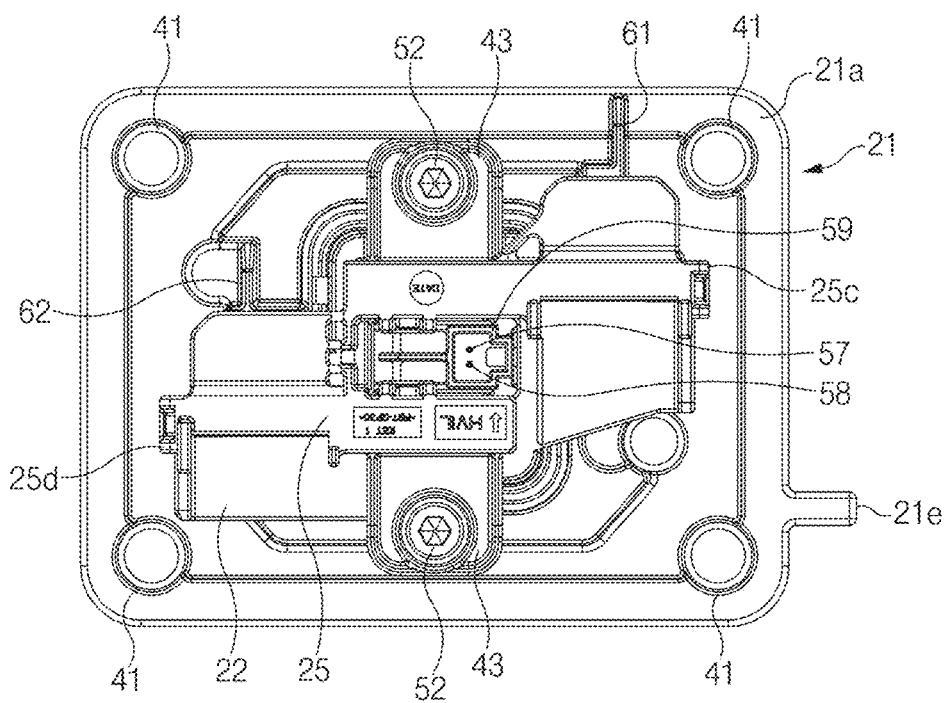
FIG. 11 illustrates a rear view, which is viewed in a direction indicated by arrow F of FIG. 7.

Referring to FIGS. 5 and 11, the header housing 31 may have a pair of holes 57 and 58 located between the first coupling portion 35 and the second coupling portion 36. A pair of interlock terminals 13 and 14 may be fitted into the pair of holes 57 and 58, respectively. The pair of interlock terminals 13 and 14 may be electrically connected to an interlock circuit (not shown) disposed in the interior space of the battery case 2. Referring to FIGS. 11 and 16, the header housing 31 may have a guide duct 59 protecting and guiding the pair of interlock terminals 13 and 14. The guide duct 59 may extend in the longitudinal direction of the connector apparatus 10.

Referring to FIGS. 2 and 3, the header housing 31 may have a pair of guide projections 48 opposing each other. When the mating connector is connected to the header housing 31, the pair of guide projections 48 may guide the assembly of the mating connector 100. The pair of guide projections 48 may protrude from the first protector 37a in a manner that they oppose each other.

Hereinafter, an assembly process of the connector apparatus 10 for a battery according to an embodiment of the present disclosure is described in detail.

An assembly process of the connector block assembly 11 is detailed below. The first electrode 23 and the second electrode 24 may be inserted into the first slot 22a and the second slot 22b of the electrode housing 22, and the first conductive nut 93 and the second conductive nut 94 may be fitted into the first recess 91 and the second recess 92 of the electrode housing 22, respectively. Then, the electrode cover 25 may be coupled to the electrode housing 22. Thereafter, the first seal member 29 may be mounted in the seal groove 21f of the block body 21, and the electrode housing 22 may be mounted to the block body 21 using the plurality of second mounting bolts 52. As a result, the assembly of the connector block assembly 11 may be completed.

An assembly process of the header assembly 12 is detailed below. Each bushing 46 may be mounted in the fifth mounting hole 45a of the corresponding fifth mounting boss 45, and the shield shell 32 may be inserted into the slot 38 of the header housing 31. Then, the second seal member 39 may be mounted in the second seal groove 31f of the header housing 31, and the first terminal 33 and the second terminal 34 may be mounted in the first cavity 35a of the first coupling portion 35 and the second cavity 36a of the second coupling portion 36, respectively. Thereafter, the pair of interlock terminals 13 and 14 may be fitted into the pair of holes 57 and 58, respectively. As a result, the assembly of the header assembly 12 may be completed.

When the assembly of the connector block assembly 11 and the assembly of the header assembly 12 are completed, the fifth mounting bosses 45 of the header housing 31 may be aligned with the fourth mounting bosses 44 of the block body 21, and the third mounting bolts 53 may be screwed into the fifth mounting holes 45a of the fifth mounting bosses 45 and the fourth mounting holes 44a of the fourth mounting bosses 44 so that the header housing 31 may be coupled to the block body 21. As the header housing 31 is coupled to the block body 21 through the third mounting bolts 53, the header assembly 12 may be releasably mounted to the connector block assembly 11.

As the block body 21 of the connector block assembly 11 is mounted on the recessed wall 4 of the battery case 2 of the battery assembly 1 through the plurality of first mounting bolts 51, the first coupling portion 35 and the second coupling portion 36 of the header housing 31 may be exposed to the outside of the battery case 2. As the mating connector 100 is coupled to the header housing 31, the first and second terminals 103 and 104 of the mating connector 100 may be electrically connected to the first and second terminals 33 and 34 of the header housing 31.

As set forth above, according to embodiments of the present disclosure, the connector block assembly having the pair of electrodes may be mounted in the battery case so that the connector block assembly may be concealed in the battery case. The header assembly having the pair of terminals may be releasably mounted to the connector block assembly so that the header assembly may be exposed to the outside of the battery case. Even if the header assembly is damaged due to careless transporting and handling or external impacts, the header assembly may be separated from the connector block assembly, making replacement and repair easy. In other words, maintenance may be simplified while not requiring disassembly of the battery case.

Hereinabove, although the present disclosure has been described with reference to specific embodiments and the accompanying drawings, the present disclosure is not limited thereto, but may be variously modified and altered by those having ordinary skill in the art to which the present disclosure pertains without departing from the spirit and scope of the present disclosure claimed in the following claims.

What is claimed is:

1. A connector apparatus for a battery, the connector apparatus comprising:
   a connector block assembly mounted in a battery case of a battery assembly, and including first and second electrodes facing an interior of the battery case; and
   a header assembly releasably mounted to the connector block assembly, and including first and second terminals connected to the first and second electrodes, respectively,
   wherein the header assembly is exposed to an exterior of the battery case, and
   the first and second terminals are electrically connected to terminals of a mating connector, respectively.

2. The connector apparatus according to claim 1, wherein the connector block assembly includes:
   a block body mounted on the battery case; and
   an electrode housing coupled to the block body and having the first and second electrodes mounted therein.

3. The connector apparatus according to claim 2, wherein the electrode housing has first and second slots, into which the first and second electrodes are inserted, respectively.

4. The connector apparatus according to claim 1, wherein the first electrode includes a first contact portion contacting the first terminal, and a first support portion perpendicular to the first contact portion,
   the second electrode includes a second contact portion contacting the second terminal, and a second support portion perpendicular to the second contact portion, and
   the first support portion extends in an opposite direction of the second support portion.

5. The connector apparatus according to claim 2, wherein the connector block assembly further includes a first seal member mounted on edges of the block body to seal a space between the block body and the battery case.

6. The connector apparatus according to claim 2, wherein the header assembly includes:
   a header housing releasably coupled to the block body, and having the first and second terminals mounted therein; and
   a shield shell inserted into the header housing to surround the first and second terminals.

7. The connector apparatus according to claim 6, wherein the header housing includes a first coupling portion in which the first terminal is mounted, and a second coupling portion in which the second terminal is mounted.

8. The connector apparatus according to claim 6, wherein the header assembly further includes a second seal member mounted on edges of the header housing to seal a space between the header housing and the block body.

9. The connector apparatus according to claim 6, wherein the block body has a central opening in which a portion of the header housing and a portion of the electrode housing are received, and
   the central opening is defined by a conductive inner peripheral surface.

10. The connector apparatus according to claim 9, wherein the block body has a conductive projection directly contacting the battery case.

11. The connector apparatus according to claim 10, wherein the block body is made of a conductive material, and
   a surface of the block body except for the conductive projection and the conductive inner peripheral surface is coated with a non-conductive material so that the block body has a non-conductive surface.

12. The connector apparatus according to claim 11, wherein the block body has a first positioning projection and a second positioning projection by which the electrode housing is positioned, and
   the first positioning projection and the second positioning projection extend toward the interior of the battery case.

13. The connector apparatus according to claim 9, wherein the shield shell includes a plurality of contact pieces contacting the conductive inner peripheral surface of the block body.

\* \* \* \* \*